(12) United States Patent
Shimogawa et al.

(10) Patent No.: US 8,512,628 B2
(45) Date of Patent: Aug. 20, 2013

(54) METHOD FOR MANUFACTURING A FIRED CERAMIC BODY INCLUDING A METALLIC WIRE INSIDE

(75) Inventors: Natsumi Shimogawa, Nagoya (JP); Shuichi Ozawa, Nagoya (JP); Nobuyuki Kobayashi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 534 days.

(21) Appl. No.: 12/691,970

(22) Filed: Jan. 22, 2010

(65) Prior Publication Data
US 2010/0194003 A1 Aug. 5, 2010

Related U.S. Application Data

(60) Provisional application No. 61/158,023, filed on Mar. 6, 2009, provisional application No. 61/158,028, filed on Mar. 6, 2009, provisional application No. 61/161,811, filed on Mar. 20, 2009.

(30) Foreign Application Priority Data

| Jan. 22, 2009 | (JP) | 2009-12078 |
| Jan. 22, 2009 | (JP) | 2009-12145 |
| Mar. 18, 2009 | (JP) | 2009-66080 |
| Jan. 22, 2010 | (JP) | 2010-11859 |

(51) Int. Cl.
*B28B 1/14* (2006.01)

(52) U.S. Cl.
USPC .................................................... 264/618

(58) Field of Classification Search
USPC ........................................................ 264/618
See application file for complete search history.

(56) References Cited

U.S. PATENT DOCUMENTS

| 3,549,393 A | 12/1970 | Elarde |
| 4,957,554 A * | 9/1990 | Mathers et al. .................. 106/35 |

(Continued)

FOREIGN PATENT DOCUMENTS

| JP | 01-152707 A1 | 6/1989 |
| JP | 11-121234 | 4/1999 |

(Continued)

OTHER PUBLICATIONS

Rahaman, M. N. Ceramic Processing and Sintering. New York: Marcel Dekker, 1995. 686-89.*

(Continued)

*Primary Examiner* — Joseph S Del Sole
*Assistant Examiner* — Russell Kemmerle, III
(74) *Attorney, Agent, or Firm* — Burr & Brown

(57) ABSTRACT

A method for manufacturing a fired ceramic body including a metal wire wherein the metal wire is placed in a mold and then, a ceramic slurry having a heat-gelling characteristic or a thermoset characteristic is poured into the mold. Subsequently, the ceramic slurry is dried and hardened to form a ceramic-compact-before-fired, and then, the ceramic-compact-before-fired is fired. In this firing process, a degreasing of the ceramic compact is firstly performed, and thereafter, a temperature of the ceramic compact is increased up to a second temperature at which the metal wire is softened and the ceramic compact is fired at a second temperature increasing rate. The second temperature increasing rate is set at such a rate that a shrinkage ratio of the ceramic compact when the temperature of the ceramic compact reaches the second temperature is smaller than or equal to a predetermined threshold shrinkage ratio.

8 Claims, 5 Drawing Sheets

(56) References Cited

U.S. PATENT DOCUMENTS

| | | |
|---|---|---|
| 7,230,514 B2 * | 6/2007 | Brunner .......................... 336/90 |
| 8,054,151 B2 * | 11/2011 | Kobayashi et al. ............. 336/83 |
| 2002/0020052 A1 * | 2/2002 | Ito et al. .......................... 29/606 |
| 2006/0194032 A1 | 8/2006 | Furuse et al. |
| 2008/0283188 A1 | 11/2008 | Oda et al. |
| 2010/0194511 A1 * | 8/2010 | Kobayashi et al. ............. 336/83 |
| 2011/0121930 A1 * | 5/2011 | Takeuchi et al. ................ 336/96 |

FOREIGN PATENT DOCUMENTS

| | | |
|---|---|---|
| JP | 11-273959 A1 | 10/1999 |
| JP | 11-340039 A1 | 12/1999 |
| JP | 11-345731 A1 | 12/1999 |
| JP | 2006-273612 A1 | 10/2006 |

OTHER PUBLICATIONS

Kin O. Low, Frank R. Sale, Electromagnetic properties of gel-derived NiCuZn ferrites, Journal of Magnetism and Magnetic Materials, vol. 246, Issues 1-2, Apr. 2002, pp. 30-35.*

Extended European Search Report dated Aug. 3, 2012.

Japanese Office Action dated Dec. 25, 2012 (with English translation).

* cited by examiner

METHOD FOR MANUFACTURING A FIRED CERAMIC BODY INCLUDING A METALLIC WIRE INSIDE

BACKGROUND OF THE INVENTION

1. Field of the Invention

The present invention relates to a method for manufacturing a fired ceramic body including in its inside a metal wire which, for example, constitutes a coil, and so on.

2. Description of the Related Art

Conventionally, a fired ceramic body including a metal wire in its inside (containing a metal wire inside) has been known. A representative example of such a fired ceramic body is a power inductor having a coil made of a metal wire in its inside.

This type of the fired ceramic body is manufactured by forming/fabricating a ceramic compact which has not been fired/burnt/sintered yet (a ceramic-compact-before-fired), and thereafter, firing the ceramic-compact-before-fired. The ceramic-compact-before-fired is formed by placing a metal wire (for example, a coil) in a mold, filling the mold with a ceramic slurry, and thereafter, drying the ceramic slurry.

However, the ceramic slurry is dried when a solvent evaporates, and the ceramic-compact-before-fired therefore shrinks relatively greatly while the ceramic slurry is being dried. On the other hand, the metal wire is "a rigid body which hardly deforms". As a result, cracks often occur in the ceramic-compact-before-fired.

Meanwhile, gelcast method (gelcast forming method) is known as one of methods for forming a ceramic-compact-before-fired. In the gelcast method, a ceramic slurry having "a heat-gelling characteristic or a thermoset characteristic" is used in place of a typical ceramic slurry. The ceramic slurry having "a heat-gelling characteristic or a thermoset characteristic" changes into a body which can keep its shape by itself (i.e., the slurry is hardened) by a chemical reaction, such as a cross-linking, and thereafter, it is dried by the evaporation of a solvent. Accordingly, the ceramic-compact-before-fired formed by the gelcast method scarcely shrinks while it is being dried. Consequently, it is possible to easily form/fabricate "a ceramic-compact-before-fired including in its inside a high rigid member such as a metal wire" having no crack in its inside, according to the gelcast method (refer to, for example, Patent Document 1).

PRIOR ART DOCUMENT

Patent Document

[Patent Document 1] Japanese Unexamined Patent Application Publication No. Hei 11-121234).

SUMMARY OF THE INVENTION

However, when "the ceramic-compact-before-fired including the metal wire in its inside" formed by the gelcast method is fired, there arise a problem of occurrence of cracks in the compact. The cracks occur because the compact formed according to the gelcast method shrinks relatively greatly during the firing process, whereas the metal wire does not shrink during the firing process.

One of the objects of the present invention is to provide "a method for manufacturing a fired ceramic body including a metal wire in its inside", which can solve the problems described above.

"The method for manufacturing a fired ceramic body including a metal wire in its inside" according to the present invention is a method for manufacturing a fired ceramic body, wherein the ceramic-compact-before-fired is formed according to the gelcast method, and thereafter, the ceramic-compact-before-fired is fired.

More specifically, the method for manufacturing a fired ceramic body according to the present invention includes steps of:

a first step of preparing the metal wire, preparing a mold having a space for storing/holding the metal wire, and placing the metal wire in the mold;

a second step of filling the mold with a ceramic slurry having a heat-gelling characteristic or a thermoset characteristic (pouring the slurry into the mold);

a third step of forming a ceramic-compact-before-fired including the metal wire in its inside by hardening and drying the ceramic slurry poured into the mold (i.e., having the slurry gelate or thermally hardening the slurry); and a fourth step of firing the ceramic-compact-before-fired.

Further, the fourth step includes a degreasing step, a firing step following the degreasing step, and a cooling step of decreasing a temperature of a fired ceramic body fired/obtained in the firing step.

The degreasing step is a step to degrease the ceramic-compact-before-fired by increasing a temperature of the ceramic-compact-before-fired to a first temperature (i.e., a degreasing temperature) at a first temperature increasing rate and then keeping the temperature of the ceramic-compact-before-fired at the first temperature for a first time period. The first temperature is not necessarily constant.

The firing step is a step of firing the ceramic-compact-before-fired by increasing the temperature of the ceramic-compact-before-fired to "a second temperature" at a second temperature increasing rate, then keeping the temperature of the ceramic-compact-before-fired at the second temperature for a second time period, the second temperature being between "a temperature lower than a melting point of the metal wire by a predetermined temperature and the melting point of the metal wire", and the second temperature being "the temperature at which the metal wire is softened". The second temperature is not necessarily constant as long as the second temperature is within the range described above.

In addition, the second temperature increasing rate is set at such a rate that "a shrinkage ratio of the ceramic-compact-before-fired" when the temperature of the ceramic-compact-before-fired reaches the second temperature is "a shrinkage ratio smaller than or equal to a predetermined threshold shrinkage ratio at which no crack occurs in the ceramic-compact-before-fired". The fact that the shrinkage ratio of the ceramic-compact-before-fired is smaller than or equal to the predetermined threshold shrinkage ratio means that a substantial firing/sintering of the ceramic-compact-before-fired has not been started.

Conventionally, the second temperature increasing rate is relatively small, the firing/sintering of the ceramic-compact-before-fired therefore proceeds before the softening of the metal wire, and the ceramic-compact-before-fired shrinks greatly. This causes cracks to occur as described above.

To the contrary, according to the present invention, the second temperature increasing rate is set at an extremely large temperature increasing rate compared with the conventional temperature increasing rate. Accordingly, it is possible to soften the metal wire before a timing at which the shrinkage ratio of the ceramic-compact-before-fired becomes large (i.e., before a timing at which the ceramic-compact-before-fired substantially starts to be fired). Consequently, when the ceramic-compact-before-fired shrinks greatly due to the progress of sintering/firing of the ceramic-compact-before-fired, a stress caused by the shrinkage of the ceramic-compact-before-fired is absorbed by a deformation (plastic-like deformation) of the metal wire. As a result, "the fired ceramic body including the metal wire in its inside" having no crack in its inside can be easily manufactured.

In this case, experiments indicate that the predetermined threshold shrinkage ratio is preferably 17%.

Further, it is preferable that the second temperature be set at "a temperature, which is higher than or equal to a temperature lower than the melting point of the metal wire by 100° C., and which is lower than the melting point of the metal wire". It is more preferable that the second temperature be set at "a temperature, which is higher than or equal to a temperature lower than the melting point of the metal wire by 80° C., and which is lower than or equal to a temperature lower than the melting point of the metal wire by 30° C.".

DETAILED DESCRIPTION OF THE INVENTION

Next will be described "a method for manufacturing a fired ceramic body including a metal wire in its inside" according to an embodiment of the present invention with reference to the drawings. By the embodiment, "a small-size inductor" which is one of examples of "the fired ceramic body including a metal wire in its inside" is manufactured. Accordingly, the method of the embodiment is also "a method for manufacturing a small-size inductor".

Figure 1:
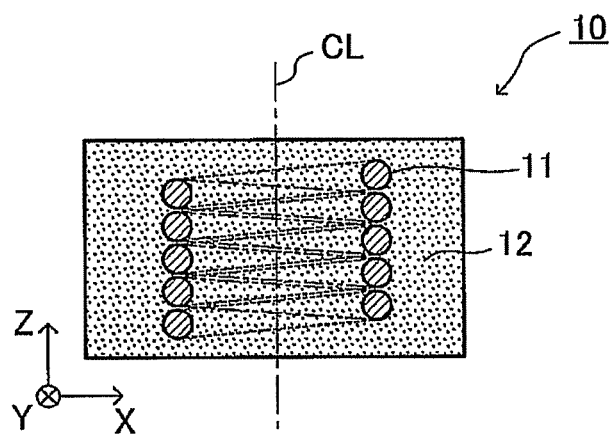
FIG. 1 is a vertical cross-sectional view of a small-size inductor (a cross-sectional view of a small-size inductor cut by a plane including an center axis of the small-size inductor) manufactured according to an embodiment of a manufacturing method (the present manufacturing method) of the present invention.
Figure 2:
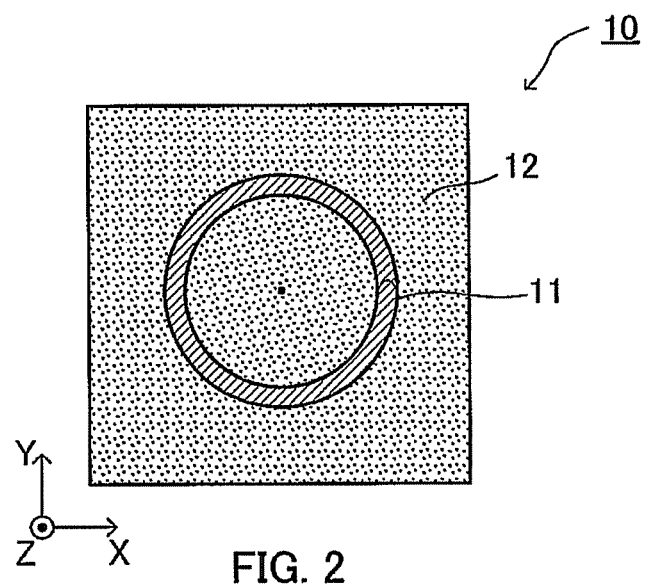
FIG. 2 is a horizontal cross-sectional view of the small-size inductor shown in FIG. 1 (a cross-sectional view of the small-size inductor cut by a plane perpendicular to the center axis of the small-size inductor)

FIG. 1 is a vertical cross-sectional view of "a small-size inductor 10" manufactured by the manufacturing method according to the embodiment of the present invention. FIG. 2 is a horizontal cross-sectional view of the small-size inductor 10. The inductor 10 has a rectangular parallelepiped shape having sides, each of which is parallel to any one of X axis, Y axis, and Z axis, orthogonal to each other. The inductor 10 comprises a coil 11 made of a metal wire and a coil-burying-body 12 (a body for a closed magnetic circuit 12).

The coil 11 is made of a high rigid metal wire (conductor) which is helically wound. An outer shape of the coil 11 is therefore a substantially cylindrical shape having a center axis CL extending along the Z axis shown in FIGS. 1 and 2. As shown in FIG. 1, the metal wire constituting the coil 11 is a silver (Ag) wire, whose cross-sectional view (cross-sectional surface of the metal wire, cut by a plane perpendicular to a longitudinal direction of the metal wire) has a circular shape having 0.1 mm in diameter (Φ0.1 mm). The coil 11 is fabricated by the wire which is wound 5 turns around the center axis.

It should be noted that the coil 11 may be constituted by a wire made of "a dense metal or a dense alloy" other than the silver. That is, the wire constituting the coil 11 may be made of a pure metal, such as Ag, Cu, Pt, and Au, or may be made of an alloy which contains a metal including at least one of Ag, Cu, Pt, and Au.

Further, the cross-sectional shape of the metal wire of the coil 11 is not limited to the circular shape, but may be a polygonal shape such as a square shape, a rectangular shape, a hexagonal shape, and a trapezoid shape, or may be a shape which is a substantial polygonal shape whose corners are arc-like shapes (rounded). Furthermore, the cross-sectional shape of the metal wire may be an ellipsoidal shape, an oblong shape, and a track-like shape, and so on. The track-like shape means a shape obtained by adding semicircles to a rectangular shape at both short sides of the rectangular shape, a diameter of the semicircle being equal to the short side of the rectangular shape.

Figure 3:
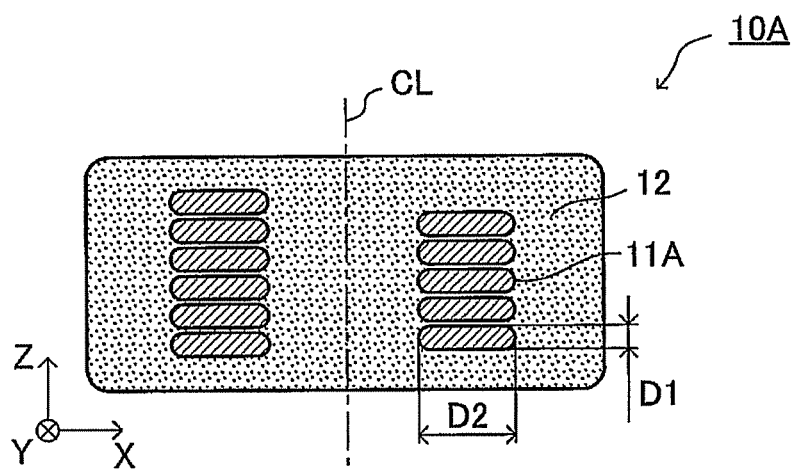
FIG. 3 is a vertical cross-sectional view of another small-size inductor manufactured according to the embodiment of the manufacturing method of the present invention.
Figure 4:
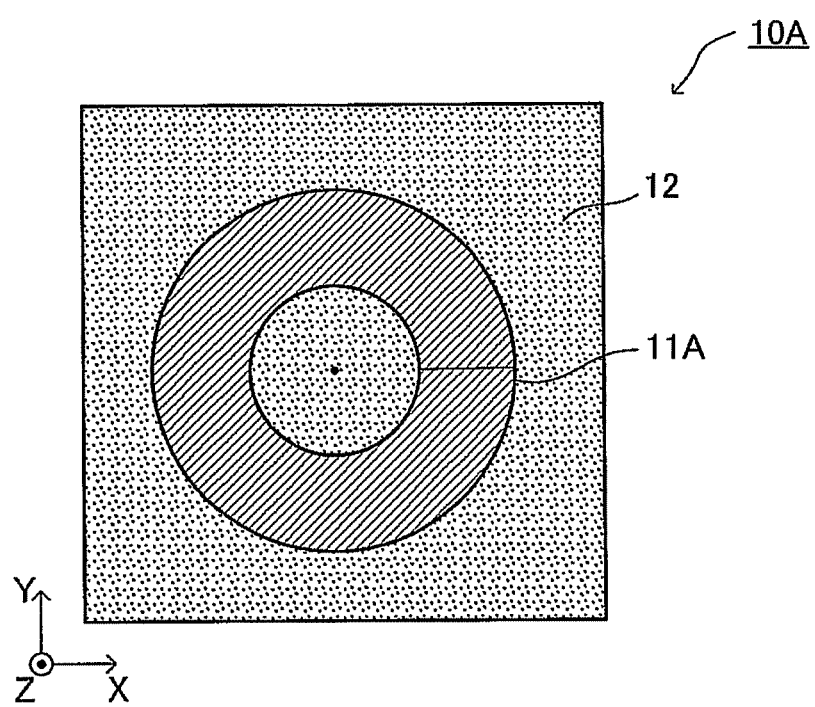
FIG. 4 is a horizontal cross-sectional view of the small-size inductor shown in FIG. 3.

FIG. 3 is a vertical cross-sectional view of an inductor 10A which is a modification of the inductor 10. FIG. 4 is a horizontal cross-sectional view of the inductor 10A. The inductor 10A is different from the inductor 10 only in that the inductor 10A has a coil 11A in place of the coil 11 of the inductor 10. The horizontal cross-sectional view of a metal wire constituting the coil 11A is one of "the track-like shapes" described above.

Like the inductor 10A, it is preferable that, in a cross-sectional view (refer to FIG. 3) of the inductor 10A cut (or taken) by a plane (e.g., X-Z plane) including the center axis CL of the coil 11A, a length D1 of the metal wire in a direction along the center axis CL of the coil 11A be smaller than a length D2 of the metal wire in a direction perpendicular to the center axis CL. In other words, it is preferable that the cross-sectional shape of the metal wire constituting the coil be flat with respect to the center axis CL of the coil 11A. An adoption of the coil having the cross-sectional shape as just described above allows a distance (i.e., a pitch) between metal wires adjacent to each other in the direction of the center axis CL to be smaller, and it is therefore possible to wind the metal wire with a high density. Consequently, the inductance can be made larger with a smaller number of turns. As a result, the inductor can be downsized because a height of the inductor (a length of the inductor along the Z axis) can be made smaller.

"The coil whose cross-sectional shape is flat" can be fabricated by winding a metal wire whose cross-sectional shape is flat. In addition, "the coil whose cross-sectional shape is flat" can also be fabricated by fabricating a helically wound coil similar to the coil 11 shown in FIG. 1 using a metal wire whose cross-sectional shape is circular, and thereafter, squashing the fabricated helically wound coil (flattening the cross-sectional shape of the metal wire) in the direction of a center axis (a center axis corresponding to the center axis CL in FIG. 1) of the coil by a 1-axis press work, etc.

Further, it is preferable that films be formed on the metal wire constituting coil 11 or coil 11A, the film being for suppressing "effusion and/or diffusion of the metal of the metal wire" when a ceramic-compact-before-fired is being fired (hereinafter, simply referred to as "during the firing period/process") described later. For example, an organic film in which nano-size powders of Silica are dispersed is preferably used for the film for the metal wire, because the organic film can suppress the effusion and/or the diffusion of the metal during the firing period while retaining a flexibility of the metal wire. Furthermore, the nano-size powders contained in the films for the metal wire may be powders which are vitrified at a firing/sintering temperature of the ceramic-compact-before-fired. This is because the film for the metal wire changes into a film having no hole/pore because of the vitrification of the nano-size powders, an effect of suppressing the effusion and/or the diffusion of the metal is therefore enhanced. It should be noted that powders dispersed in the organic film are not necessarily nano-size powders. For example, an organic film in which flat inorganic powders are dispersed in a lying-over-one-another fashion (or a piling-one-after-another fashion) is preferably used as the film for the metal wire. This is because the organic film containing "the flat inorganic powders" can retain the flexibility of the metal wire since the flat inorganic powders can move/slide smoothly each other, and can enhance the effect of suppressing the effusion and/or the diffusion of the metal since holes are hardly formed in a direction of a thickness of the film during the firing period. It should be noted that, a thickness of the various films described above which have not been fired is preferably between around 5 to 50 μm.

Furthermore, the film for the metal wire may be formed by plating or sputtering, etc. In addition, the film for the metal wire may be made of a substance, such as "an oxide, a nitride, a carbide, and precious metal", which is stable at the firing temperature of the ceramic-compact-before-fired, or may be made of a metal film which changes into an oxide film at the firing temperature of the ceramic-compact-before-fired.

Referring back to FIGS. 1 and 2 again, the coil-burying-body (the body for a closed magnetic circuit) 12 is a fired ceramic body having a high magnetic permeability. An outer shape of the coil-burying-body 12 is a rectangular parallelepiped shape having sides, each of which is parallel to any one of the X axis, the Y axis, and the Z axis. As shown in FIG. 2, the shape of the coil-burying-body 12 in plan view is substantially square. A length of each of sides of the square is larger than an outer diameter of the coil 11 in plan view. A height (a length in the Z axis direction) of coil-burying-body 12 is larger than a height (a length in the Z axis direction) of the coil 11. Accordingly, the coil-burying-body 12 includes the coil 11 made of the metal wire in its inside. It should be noted that the coil-burying-body 12 may have a substantially cylindrical shape.

<Manufacturing Method>

Next will be described "the method for manufacturing the inductor 10 (the fired ceramic body 10 including the metal wire in its inside)" according to the embodiment of the present invention. This manufacturing method includes a first to a fourth step/process. Each of the steps will be described hereinafter.

(1) First Step:
The first step includes,
(1-1) a coil preparing step of preparing a coil made of a metal wire;
(1-2) a mold preparing step of preparing a mold which is "a mold for storing/holding the metal wire"; and
(1-3) a coil placing step of placing the coil made of the metal wire in the mold.

That is, the first step is a step wherein the metal wire is prepared, the mold having a space for storing the metal wire is prepared, and the metal wire is placed in the mold. Each of the steps will be described in detail hereinafter.

(1-1) The Coil Preparing Step of Preparing a Coil.

First, a silver wire is prepared, whose cross-sectional shape has a circular shape having 0.1 mm in diameter (Φ0.1 mm) as the metal wire. Subsequently, the silver wire is coated by a film (10 μm in thickness) composed of a resin (dispersed resin) in which ferrite powders are dispersed. The resin contained in the dispersed resin is polyester. A grain diameter of the ferrite grain/powder contained in the dispersed resin is 0.5 μm. The ferrite grains/powders are added to the dispersed resin in such a manner that a volume ratio of the ferrite powders becomes equal to 40%.

Figure 5:
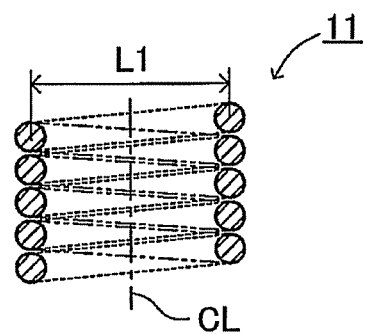
FIG. 5 is a cross-sectional view of a coil shown in FIG. 1.

Subsequently, as shown in FIG. 5, the silver wire is wound 5 turns around the center axis CL to fabricate the helically wound coil 11. A diameter (coil diameter) L1 of the coil 11 is 1.4 mm. It should be noted that the diameter of the silver wire, the number of turns and the diameter L1 of the coil 11, and the component of the resin in which the ferrite powders are dispersed, and so on, may be modified and adjusted, appropriately. In this manner, the coil 11 made of the metal wire is prepared.

(1-2) The Mold Preparing Step.

Figure 6:
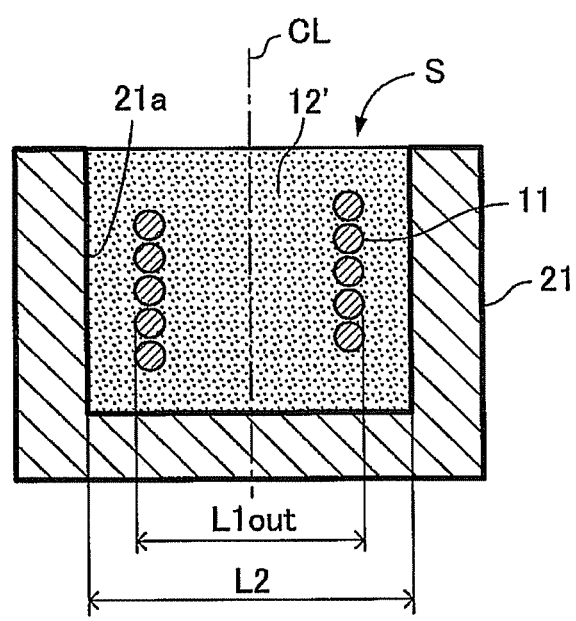
FIG. 6 is a view including a vertical cross-sectional view of a mold used in the present manufacturing method.

Independently (separately) from the preparation of the coil 11, a mold 21 shown in FIG. 6 is prepared. The mold 21 comprises a concave portion 21a for holding/storing the coil 11. A shape of the concave portion 21a is substantially rectangular parallelepiped. A shape of an upper surface (open surface) and a bottom surface of the concave portion 21a is substantially square.

A length L2 of each side of the bottom surface of the concave portion 21a is larger than an outer diameter L1 out of the coil 11. A depth of the concave portion 21a is larger than a height of the coil 11. That is, the concave portion 21a is a space larger than the coil 11 (a shape defined by an outer circumference of the coil 11), so that the concave portion 21a can hold/store the coil 11.

(1-3) The Coil Placing Step.

As shown in FIG. 6, the coil placing step is a process in which the coil 11 made of the metal wire is placed within the mold 21 (the concave portion 21a). At this time, the coil 11 is arranged so as to be coaxial with the concave portion 21a of the mold 21. That is, the coil 11 is stored in the concave portion 21a in such a manner that the center axis CL of the coil 11 is on a center axis of the concave portion 21a. The coil 1'1 is held/stored so as to be completely inside of the concave portion 21a and in such a manner that an outer circumference of the coil 111s apart, by a predetermined distance, from each wall surface of the concave portion 21a. It should be noted, that, in actuality, both ends of the coil 11 are formed in a linear fashion, and the linear portions are held by the mold 21, so that the coil 11 are substantially housed in the concave portion 21a.

(2) Second Step:
The second step includes,
(2-1) a ceramic slurry S preparing step of preparing a ceramic slurry having "a heat-gelling characteristic or a thermoset characteristic"; and
(2-2) a cast molding step of filling the mold 21 with the ceramic slurry S (pouring the ceramic slurry S into the mold 21).

Each of the steps will be described in detail hereinafter.

(2-1) The Ceramic Slurry S Preparing Step.

A ceramic slurry S is prepared. The ceramic slurry S is a ceramic slurry, which contains magnetic powders and has "a heat-gelling characteristic or a thermoset characteristic". It should be noted that the ceramic slurry S may be a slurry having "a heat-gelling characteristic or a thermoset characteristic" and containing powders which exhibit/realize a high magnetic permeability after fired.

In the present example, the ceramic slurry S is prepared as follows.

Ferrite powders are prepared as the magnetic powders. For the ferrite powders, Ni—Cu—Zn ferrite powders, supplied by Japan Metals & Chemicals Co., Ltd. (Part Number JR21, 0.8 μm in median diameter) are used.

Subsequently, the ferrite powders are put into a ball mill in such a manner that a volume fraction of the ferrite powders is kept at 40%, together with zirconia balls, a solvent, and a dispersion media, to be mixed. At this time, the ball mill is rotated at 80 rpm for 24 hours.

The solvent and the dispersion media are as follows.
The solvent:
The solvent is a mixture of triacetin and glutaric acid dimethyl. In the mixture, ratio by weight of the triacetin to the glutaric acid dimethyl is 1:9.
The dispersion media:
The dispersion media contains 4.3 parts by weight of MALIALIM (Trade name) per 100 parts by weight of the solvent.

A resin, a hardening agent, and a catalyst, described below, are added to the resultant slurry obtained by the mixture by the ball milling.
The resin:
6.5 parts by weight of 4,4'-diphenylmethane diisocyanate per 100 parts by weight of the solvent.
The hardening agent:
0.38 parts by weight of ethylene glycol per 100 parts by weight of the solvent.
The catalyst:
0.05 parts by weight of 6-Dimethylamino-1-hexanol per 100 parts by weight of the solvent.

As a result, the ceramic slurry S is prepared, the slurry S containing the magnetic powders, having "the heat-gelling characteristic or the thermoset characteristic (in the present example, the thermoset characteristic)".

(2-2) The Cast Molding Step.

Subsequently, as shown in FIG. 6, the first ceramic slurry S is put/poured into the mold 21 (the concave portion 21a). It should be noted that a mold release agent is applied to surfaces of the concave portion 21a in advance. As a result, the ceramic slurry S exists densely around the coil 11. The steps described above are the second step.

(3) Third Step:

The third step is a process in which the ceramic slurry S poured into the mold (mold 21) is hardened (i.e., the slurry S gelates or is thermally-hardened) and dried so as to fabricate a ceramic-compact-before-fired having the coil 11 made of the metal wire in its inside.

Figure 7:
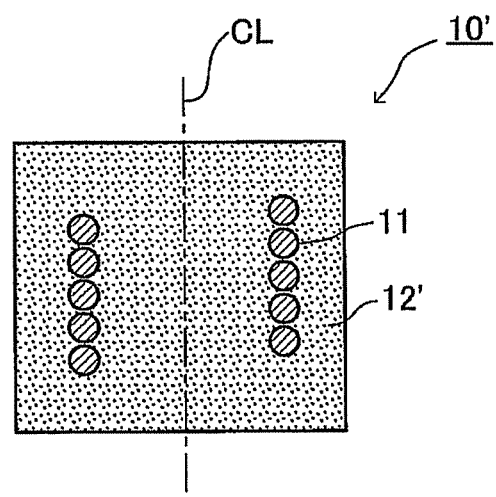
FIG. 7 is a vertical cross-sectional view of a ceramic-compact-before-fired formed at a middle/intermediate stage of the present manufacturing method.

More specifically, the ceramic slurry S poured into the mold 21 is held/kept in the mold 21 for 24 hours. During this period, the ceramic slurry S gelates. Subsequently, the ceramic slurry S which has gelated is dried in a temperature of 130° C. for 4 hours. As a result, a hardened body made of the hardened gel is formed. Thereafter, the hardened body is taken out from the mold 21 (the mold is released). Consequently, "the ceramic-compact-before-fired 10'" shown in FIG. 7 is fabricated.

(4) Fourth Step:
The fourth step includes,
(4-1) a degreasing step;
(4-2) a firing step; and
(4-3) a cooling (decreasing a temperature) step.

The fourth step is a process to form/fabricate a fired ceramic body which is a final product. Each of the steps will be described in detail hereinafter.

(4-1) The Degreasing Step.

First, the thus formed ceramic-compact-before-fired 10' is set/placed in a furnace. Subsequently, as shown by a solid line in FIG. 8, an environmental temperature (a furnace temperature) is increased up to 500° C. (a first temperature, i.e., a degreasing temperature) at a rate of temperature increase of 50° C./h (a first temperature increasing rate), and then, the environmental temperature is kept at 500° C. for 2 hours (a first time period). As a result, a degreasing of the ceramic-compact-before-fired 10' is performed. That is, the degreasing step is a process in which "a temperature of the ceramic-compact-before-fired 10' is increased up to the first temperature at the first temperature increasing rate, and thereafter, the temperature of the ceramic-compact-before-fired 10' is kept at the first temperature for the first time period", to thereby degrease the ceramic-compact-before-fired 10'. The furnace temperature is substantially the same as the temperature of the ceramic-compact while the fourth step is being performed. It should be noted that the first temperature increasing rate may be a constant rate or be a varying rate. Further, the first temperature is not necessarily constant as long as the degreasing of the ceramic-compact-before-fired 10' is performed at the first temperature.

(4-2) The Firing Step.

Figure 8:
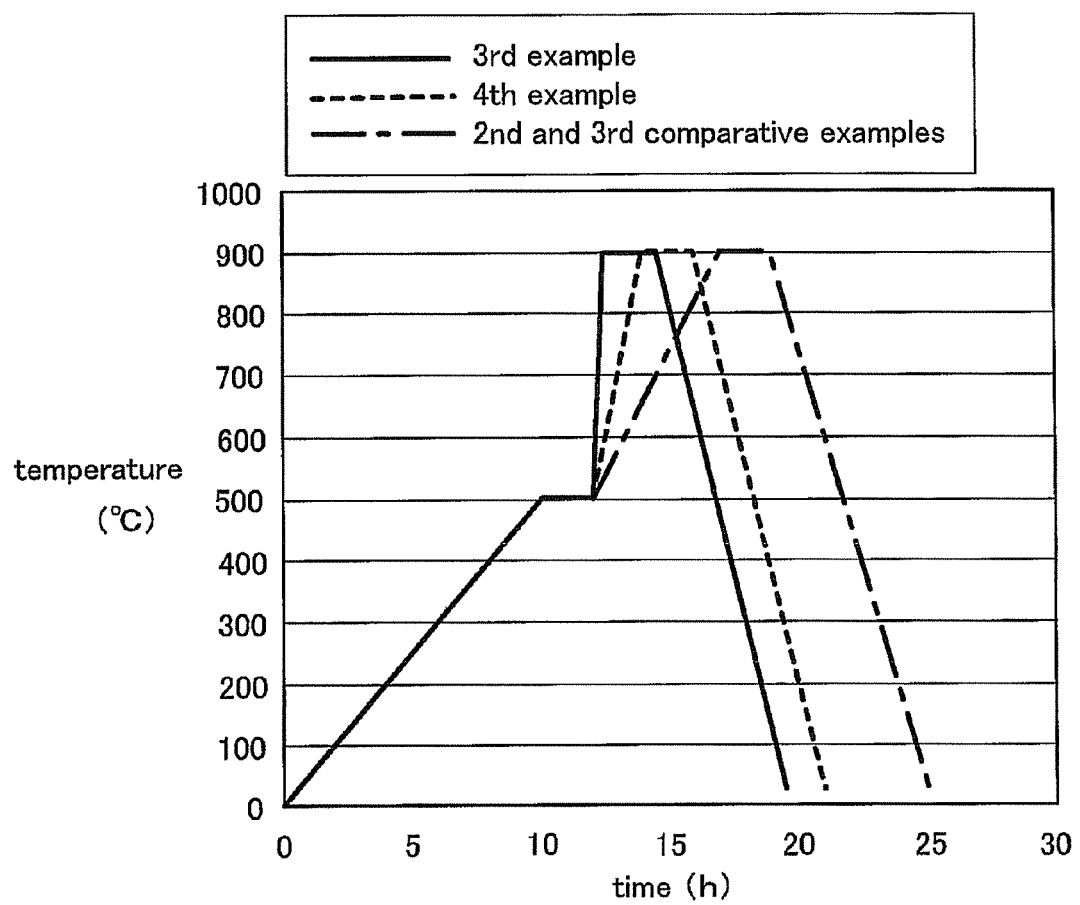
FIG. 8 is a time-line chart showing temperature profiles in a firing process, according to the present manufacturing method and the conventional manufacturing method.

Subsequently, as shown by the solid line in FIG. 8, the environmental temperature (the furnace temperature) is increased up to 900° C. (a second temperature, i.e., a firing temperature) from 500° C. (the first temperature, i.e., the degreasing temperature) at a rate of temperature increase of 800° C./h (a second temperature increasing rate), and then, the environmental temperature is kept at 900° C. for 2 hours (a second time period). As a result, the ceramic-compact-before-fired 10' is fired/sintered, and a fired ceramic body is thereby obtained. Thereafter, connecting terminals etc. are formed onto the thus obtained fired ceramic body. The connecting terminals are formed by, for example, plating the fired ceramic body with an Ag paste with keeping a temperature of 600° C. for 30 minutes. Consequently, the inductor 10 shown in FIGS. 1 and 2 is manufactured.

In the firing step, the second temperature (the firing temperature) is a temperature at which the ceramic-compact-before-fired 10' can be fired/sintered and the coil 11 can be softened. In other words, the second temperature is a temperature between "a temperature which is lower than a melting point of the metal wire constituting the coil 11 by a predetermined temperature" and "the melting point of the metal wire".

More specifically, the second temperature is set at a temperature, which is higher than or equal to "a temperature lower than the melting point of the metal wire constituting the coil 11 by 100° C.", and which is lower than "the melting point of the metal wire constituting the coil 11". It is more preferable that the second temperature be set at a temperature, which is higher than or equal to "a temperature lower than the melting point of the metal wire by 80° C.", and which is lower than or equal to "a temperature lower than the melting point of the metal wire by 30° C.". Accordingly, in the above case where the metal wire is made of silver whose melting point is 962° C., the second temperature is preferably "a temperature which is higher than or equal to 862° C. and is lower than or equal to 962° C.", and the second temperature is more preferably "a temperature which is higher than or equal to 882° C. and is lower than or equal to 932° C.

In addition, the second temperature increasing rate is set as follows. When the temperature (i.e., the furnace temperature) of the ceramic-compact-before-fired 10' increases up to the second temperature (900° C.) from the first temperature (500° C.), "a shrinkage ratio (or a shrinking percentage) of the ceramic-compact-before-fired 10'" coincides with "a shrinkage ratio smaller than or equal to a predetermined threshold shrinkage ratio at which no crack occurs in the ceramic-compact-before-fired 10'". The fact that the shrinkage ratio of the ceramic-compact-before-fired 10' is smaller than or equal to "the predetermined threshold shrinkage ratio" means that the ceramic-compact-before-fired 10' is in a state before the ceramic-compact-before-fired 10' substantially starts to be fired.

Conventionally, the rate of temperature increase when the temperature of the ceramic-compact-before-fired is increased from the degreasing temperature to the firing temperature is relatively small. That is, as shown by a dashed-dotted line shown in FIG. 8, for example, the rate of temperature increase according to the conventional manufacturing method during the firing period is about 80° C./h. Accordingly, the sintering/firing of the ceramic-compact-before-fired 10' proceeds and thus the ceramic-compact-before-fired 10' shrinks greatly before the coil 11 made of the metal wire starts to be softened. Meanwhile, the coil 111s rigid and does not shrink. As a result, cracks occur.

To the contrary, according to the manufacturing method of the embodiment described above, when the ceramic-compact-before-fired 10' is fired, the second temperature increasing rate is set at a rate faster than or equal to 200° C./h, which is much faster compared to the conventional temperature increasing rate. Accordingly, the metal wire 11 becomes softened by/before a timing at which the shrinkage ratio (or a shrinking percentage) of the ceramic-compact-before-fired 10' becomes large (i.e., a timing at which a substantial firing/sintering of the ceramic-compact-before-fired 10' starts). Consequently, when the ceramic-compact-before-fired 10' shrinks greatly due to the progress of sintering/firing of the ceramic-compact-before-fired 10', a stress caused by the shrinkage of the ceramic-compact-before-fired 10' is absorbed by a deformation (plastic-like deformation) of "the softened metal wire 11". As a result, "the fired ceramic body including the metal wire in its inside" having no crack in its inside can be easily manufactured.

It should be noted that the second temperature increasing rate may be a constant rate or be a varying rate. Further, the second temperature is not necessarily constant as long as the second temperature is within the range described above.

(4-3) The Cooling (Decreasing a Temperature) Step.

Thereafter, "the fired ceramic body including the metal wire in its inside" thus manufactured through the processes described above is cooled down to a room temperature at a predetermined temperature decreasing rate.

Comparison Between the Embodiments and Comparative Embodiments

Experiments were carried out to compare examples (a first to a sixth example) manufactured according to the manufacturing method of the present invention with comparative examples (a first comparative example to a fourth comparative example) manufactured according to a manufacturing method to which the present invention is not applied. Each ceramic-compact-before-fired used in the experiments had the same structure as the ceramic-compact-before-fired shown in FIGS. 1 and 2, whose dimensions were 30×25×15 mm (25×20×10 mm after the compacts were fired).

In the experiments, each ceramic-compact-before-fired was formed according to the fabricating/forming processes with using gelcast method described in the above embodiments, from a ceramic slurry having components described below. Thereafter, each ceramic-compact-before-fired thus formed was fired with various temperature change patterns (firing profiles) during the firing period described below.

(The ceramic slurry for the 1st, the 2nd, the 4th, the 5th, and the 6th examples, as well as, the 1st, the 3rd, and the 4th comparative examples)

The compositions of the ferrite powders contained in the ceramic slurry is $Fe_2O_3$ (47.5 mol %).NiO (16.3 mol %).ZnO(27.3 mol %).CuO (8.7 mol %).$MnO_2$ (0.2 mol %). A solvent, and a dispersion media, a resin, a hardening agent, and a catalyst, etc. are the same as those included in the ceramic slurry S of the embodiment described above.

(The ceramic slurry for the 3rd example and the 2nd comparative example)

The ceramic slurry for these examples are the same as the ceramic slurry S of the embodiment described above. Accordingly, the ferrite powders contained in the ceramic slurry is Ni—Zn—Cu ferrite powders (Part number JR21).

The firing profiles of each of the examples and the comparative examples are shown in the Tables below. It should be noted that, with respect to the filing profiles shown in those Tables, a rate of temperature increase between "one point defined by time and temperature" and "another point defined by time and temperature" adjacent to the one point is constant.

The filing profile for the 1st example is shown in Table 1.

TABLE 1

| Time (h) | 0 | 10 | 12 | 12.5 | 14.5 | 19.5 |
|---|---|---|---|---|---|---|
| Temperature (° C.) | 0 | 500 | 500 | 862 | 862 | 30 |

The filing profile for the 2nd example is shown in Table 2.

TABLE 2

| Time (h) | 0 | 10 | 12 | 12.5 | 14.5 | 19.5 |
|---|---|---|---|---|---|---|
| Temperature (° C.) | 0 | 500 | 500 | 882 | 882 | 30 |

The filing profile for the 3rd example is shown in Table 3.

TABLE 3

| Time (h) | 0 | 10 | 12 | 12.5 | 14.5 | 19.5 |
|---|---|---|---|---|---|---|
| Temperature (° C.) | 0 | 500 | 500 | 900 | 900 | 30 |

The filing profile for the 4th example is shown in Table 4.

TABLE 4

| Time (h) | 0 | 10 | 12 | 14 | 16 | 21 |
|---|---|---|---|---|---|---|
| Temperature (° C.) | 0 | 500 | 500 | 900 | 900 | 30 |

The filing profile for the 5th example is shown in Table 5.

TABLE 5

| Time (h) | 0 | 10 | 12 | 12.2 | 14.2 | 19.2 |
|---|---|---|---|---|---|---|
| Temperature (° C.) | 0 | 500 | 500 | 932 | 932 | 30 |

The filing profile for the 6th example is shown in Table 6.

TABLE 6

| Time (h) | 0 | 10 | 12 | 12.2 | 14.2 | 19.2 |
|---|---|---|---|---|---|---|
| Temperature (° C.) | 0 | 500 | 500 | 962 | 962 | 30 |

The filing profile for the 1st comparative example is shown in Table 7. In this example, the firing temperature (corresponding to the second temperature) is 850° C., and is not "the temperature which is higher than or equal to 862° C. and is lower than or equal to 962° C." described above.

TABLE 7

| Time (h) | 0 | 10 | 12 | 12.4 | 14.4 | 19.4 |
|---|---|---|---|---|---|---|
| Temperature (° C.) | 0 | 500 | 500 | 850 | 850 | 30 |

The filing profile for the 2nd comparative example is shown in Table 8. In this example, the second rate of temperature increase was set at a small rate (80° C./h).

TABLE 8

| Time (h) | 0 | 10 | 12 | 17 | 19 | 25 |
|---|---|---|---|---|---|---|
| Temperature (° C.) | 0 | 500 | 500 | 900 | 900 | 30 |

The filing profile for the 3rd comparative example is shown in Table 9. In this example, the second rate of temperature increase was set at a small rate (80° C./h).

TABLE 9

| Time (h) | 0 | 10 | 12 | 17 | 19 | 25 |
|---|---|---|---|---|---|---|
| Temperature (° C.) | 0 | 500 | 500 | 900 | 900 | 30 |

The filing profile for the 4th comparative example is shown in Table 10. In this example, the firing temperature (corresponding to the second temperature) is 972° C., and is not "the temperature which is higher than or equal to 862° C. and is lower than or equal to 962° C." described above.

TABLE 10

| Time (h) | 0 | 10 | 12 | 12.2 | 14.2 | 19.2 |
|---|---|---|---|---|---|---|
| Temperature (° C.) | 0 | 500 | 500 | 972 | 972 | 30 |

According to the experiments, no crack did not occur in the 2nd to the 6th example. In the 1st example, a large crack which reached an outer surface of the fired ceramic body was not observed, however, a small number of little cracks which do not cause any problems were observed in the fired ceramic body. In the 6th embodiment, the effusion/diffusion of the Ag of the metal wire was observed, however, the effusion/diffusion was so little that it did not cause any short circuits in the coil.

To the contrary, in the 1st to the 3rd comparative examples, large cracks that cause problems were observed. It is inferred that the reason why the cracks occurred in the 1st comparative example is that the firing temperature (the temperature corresponding to the second temperature) was too low. It is inferred that the reason why the cracks occurred in the 2nd and 3rd comparative examples is that the second rate of temperature increase was too small. Further, in the 4th comparative example, the effusion/diffusion of the Ag of the metal wire was observed, and short circuits in the coil were observed, although no crack was observed. It is inferred that the reason for this is that the firing temperature (the temperature corresponding to the second temperature) was too high.

Further, a shrinkage ratio of each of the ceramic-compacts-before-fired when a temperature of each of the ceramic-compacts-before-fired reached its firing temperature (the second temperature) was measured. The measurement of the shrinkage ratio was performed as follows. Each of the ceramic-compacts-before-fired was fabricated, which has a cylindrical shape whose diameter is 4 mm (Φ4 mm) and whose height is 5 mm, using a slurry which is the same as the slurry of each of the embodiments or of the comparative embodiments described above. Thereafter, the shrinkage ratio of each of the cylindrical ceramic-compacts-before-fired was measured by a thermal mechanical analyzer (supplied by Rigaku Corporation: Part number TMA 8310). The measurement results are shown in Table 11.

TABLE 11

| | Compositon of Ferrite Powders | First Temp. (° C.) | First temperature increasing rate (° C./Hr) | Second Temp. (° C.) | Second temperature increasing rate (° C./Hr) | shrinkage ratio (%) | Crack | effusion and/or diffusion of Ag | Evaluation result |
|---|---|---|---|---|---|---|---|---|---|
| 1st example | NiCuZn | 500 | 50 | 862 | 800 | 12.5 | none (but small cracks) | none | good |
| 2nd example | NiCuZn | 500 | 50 | 882 | 800 | 14.0 | none | none | excellent |
| 3rd example | JR21 | 500 | 50 | 900 | 800 | 8.5 | none | none | excellent |
| 4th example | NiCuZn | 500 | 50 | 900 | 200 | 17.0 | none | none | excellent |
| 5th example | NiCuZn | 500 | 50 | 932 | 2000 | 5.0 | none | none | excellent |
| 6th example | NiCuZn | 500 | 50 | 962 | 2000 | 6.5 | none | almost none (*Note 1) | good |
| 1st comparative example | NiCuZn | 500 | 50 | 850 | 800 | 10.0 | observed | none | not good |
| 2nd comparative example | JR21 | 500 | 50 | 900 | 80 | 26.0 | observed | none | not good |
| 3rd comparative example | NiCuZn | 500 | 50 | 900 | 80 | 20.0 | observed | none | not good |

TABLE 11-continued

| | Compositon of Ferrite Powders | First Temp. (° C.) | First temperature increasing rate (° C./Hr) | Second Temp. (° C.) | Second temperature increasing rate (° C./Hr) | shrinkage ratio (%) | Crack | effusion and/or diffusion of Ag | Evaluation result |
|---|---|---|---|---|---|---|---|---|---|
| 4th comparative example | NiCuZn | 500 | 50 | 972 | 2000 | 8.5 | none | observed (effusion) | not good |

(*Note 1;
diffusion was partly observed)

It is understood and confirmed from Table 11 that, if "the shrinkage ratio of each of the ceramic-compacts-before-fired 10'" is smaller than or equal to 17% when the temperature of the ceramic-compact-before-fired 10' increases to the second temperature (the firing temperature) from the first temperature (500° C.), no crack occurs in the fired ceramic body. Further, it is also confirmed that the second temperature should be a temperature at which the metal wire is softened, and should be between "a temperature lower than the melting point of the metal wire by the predetermined temperature" and "the melting point of the metal wire" (in a case where the metal wire is made of silver, the second temperature should be higher than or equal to the 862° C. and is lower than or equal to 962° C.).

In view of the above, it is concluded that "the fired ceramic body containing the metal wire in its inside" having no crack can be manufactured, when the second rate of temperature increase, at which a temperature of the ceramic-compact-before-fired is increased from "the first temperature which is the degreasing temperature" to "the second temperature, which is the firing temperature of the ceramic-compact-before-fired, and at which the metal wire is softened", is set at such a rate of temperature increase that "the shrinkage ratio of the ceramic-compact-before-fired is smaller than or equal to the predetermined threshold shrinkage ratio (17% in the present example)" when "the temperature of the ceramic-compact-before-fired reaches the second temperature". In other words, "the fired ceramic body containing the metal wire in its inside" having no crack can be manufactured, if the second rate of temperature increase is set at a rate such that the softening of the metal wire starts before "the substantial start of the firing of the ceramic compact". It is preferable that the second rate of temperature increase, at which the temperature of the ceramic-compact-before-fired is increased from "the first temperature which is the degreasing temperature" to "the second temperature, which is the firing temperature of the ceramic-compact-before-fired, and at which the metal wire is softened", be larger than or equal to 200° C./h.

Notably, in the present invention, it is preferable that the ceramic-compact-before-fired be a compact which shrinks gradually when the temperature of the compact is increased. This is because, if the ceramic-compact-before-fired which shrinks rapidly (i.e., compact whose sintering and shrinking starts drastically at a temperature lower than the softening temperature of the metal wire) is used, the second rate of temperature increase must be extremely large in order for the shrinkage ratio when the temperature of the compact reaches the second temperature to be smaller than or equal to the predetermined threshold shrinkage ratio (17%).

In other words, in the present invention, using a ceramic-compact-before-fired which shrinks gradually when the temperature is increased allows "the shrinkage ratio when the temperature of the compact reaches the second temperature" to be smaller than or equal to the predetermined threshold shrinkage ratio (17%) without setting the second rate of temperature increase at an extremely large rate. Accordingly, it is preferable in the present invention that the ceramic-compact-before-fired which shrinks gradually be formed/fabricated and the ceramic-compact-before-fired be fired according to the firing process of the present embodiment described above.

In order to form "the ceramic-compact-before-fired which shrinks gradually when the temperature is increased", it is preferable that "a ceramic slurry to which no sintering additive which forms liquid phase is added" be used as the material. This is because, if "the sintering additive which forms liquid phase" is added to the ceramic slurry, the ceramic compact made of the ceramic slurry shrinks rapidly at a temperature at which the liquid phase is formed, and accordingly, the second rate of temperature increase must be extremely large in order for the shrinkage ratio when the temperature of the compact reaches the second temperature to be smaller than or equal to the predetermined threshold shrinkage ratio (17%). To the contrary, if "the sintering additive which forms liquid phase" is not added to the ceramic slurry, the ceramic compact made of the ceramic slurry shrinks gradually when the temperature of the ceramic compact is increased, and accordingly, the shrinkage ratio when the temperature of the compact reaches the second temperature can be made smaller than or equal to the predetermined threshold shrinkage ratio (17%), without setting the second rate of temperature increase at an extremely large rate.

Furthermore, although it is effective to increase the second rate of temperature increase in order to have the shrinkage ratio when the temperature of the compact reaches the second temperature be smaller than or equal to "the predetermined threshold shrinkage ratio (17%)", it is also effective to decrease "a total amount of the shrinkage of the ceramic compact itself" by increasing a forming density of the ceramic compact.

The method for manufacturing the fired ceramic body according to the embodiment of the present invention has been described. According to the method, "the fired ceramic body, including the metal wire in its inside but having no crack in its inside" can be easily manufactured. It should be noted that the present invention is not limited to the above embodiment, but may be modified as appropriate without departing from the scope of the invention. For example, the cross sectional view of the coil 11 cut by the plane perpendicular to the extending axis of the winding (in a direction of the center axis CL) is not limited to the circular shape, but may be oval, square, rectangular, and so on. In other words, the outer shape of the helically wound coil is not limited to the cylindrical column, but may be a rectangular parallelepiped, a truncated cone, and so on. The helically wound winding means to include a spiral winding. Moreover, the manufacturing method of the present invention is not limited to a method for manufacturing the inductor, but includes methods for manufacturing any fired ceramic body as long as it includes a circuit made of a metal wire and the like in its inside. Further, the first temperature kept during the degreasing process is not necessarily a constant temperature, and the second temperature kept during the firing process is not necessarily a constant temperature.

It should be noted that the present invention is extremely effective, when the manufactured fired ceramic body is a device, whose size is around 25×20×10 mm, which includes a metal wire constituting a coil whose diameter is 50 to 200 μm in its inside, and wherein a distance (a pitch) between wires of the coil is 10 to 50 μm and the number of the turns for the coil is greater than or equal to 4. That is, the present invention is extremely effective, when the device is manufactured, the device being a fired ceramic body in which a volume ratio of the conductor (the metal wire) included in the ceramic body is large, and the conductor concentrates (i.e., the wire distance (the pitch) is small when the conductor constitutes a coil). This is because cracks easily occur in such a device.

Furthermore, in the present embodiment described above, the temperature starts to be increased toward the second temperature (i.e., the firing process is performed) immediately after the degreasing process ends. However, "the ceramic-compact-before-fired after degreased" is placed in a different furnace after the degreasing process, and thereafter, the firing process starts to be performed. That is, it is not necessary to starts the firing process immediately after the degreasing process.

The invention claimed is:

1. A method for manufacturing a fired ceramic body including a metal coil in its inside comprising the steps of:
    a first step of preparing said metal coil, preparing a mold having a space for storing said metal coil, and placing said metal coil in said mold;
    a second step of filling said mold with a ceramic slurry having a heat-gelling characteristic or a thermoset characteristic;
    a third step of forming a ceramic-compact-before-fired including said metal coil in its inside by hardening and drying said ceramic slurry in said mold; and
    a fourth step of firing said ceramic-compact-before-fired; wherein,
    said fourth step including steps of:
        a degreasing step of degreasing said ceramic-compact-before-fired by increasing a temperature of said ceramic-compact-before-fired to a first temperature at a first temperature increasing rate, and then keeping said temperature of said ceramic-compact-before-fired at said first temperature for a first time period;
        a firing step of firing said ceramic-compact-before-fired by increasing said temperature of said ceramic-compact-before-fired to a second temperature at a second temperature increasing rate, then keeping said temperature of said ceramic-compact-before-fired at said second temperature for a second time period, said second temperature being a temperature between a temperature lower than a melting point of said metal coil by a predetermined temperature and said melting point of the metal coil, and at which said metal coil is softened; and
        a cooling step of decreasing said temperature of a fired ceramic body fired in said firing step, wherein,
    said second temperature increasing rate is set at such a rate that a shrinkage ratio of said ceramic-compact-before-fired when said temperature of said ceramic-compact-before-fired reaches said second temperature is smaller than or equal to a predetermined threshold shrinkage ratio at which no crack occurs in said ceramic-compact-before-fired owing to softening of said metal coil,
    wherein said second temperature increasing rate is higher than said first temperature increasing rate,
    wherein said metal coil is formed of one of a metal wire and an alloy wire that is helically wound and on which one or more films for suppressing at least one of effusion and diffusion of said metal or said alloy during firing.

2. The method for manufacturing the fired ceramic body according to claim 1, wherein said predetermined threshold shrinkage ratio is 17%.

3. The method for manufacturing the fired ceramic body according to claim 2, wherein said second temperature is set at a temperature, which is higher than or equal to a temperature lower than said melting point of said metal wire by 100° C., and which is lower than said melting point of said metal wire.

4. The method for manufacturing the fired ceramic body according to claim 2, wherein said second temperature is set at a temperature, which is higher than or equal to a temperature lower than said melting point of said metal wire by 80° C., and which is lower than or equal to a temperature lower than said melting point of said metal wire by 30° C.

5. The method for manufacturing the fired ceramic body according to claim 1, wherein said second temperature is set at a temperature, which is higher than or equal to a temperature lower than said melting point of said metal wire by 100° C., and which is lower than said melting point of said metal wire.

6. The method for manufacturing the fired ceramic body according to claim 1, wherein said second temperature is set at a temperature, which is higher than or equal to a temperature lower than said melting point of said metal wire by 80° C., and which is lower than or equal to a temperature lower than said melting point of said metal wire by 30° C.

7. The method of manufacturing the fired ceramic body according to claim 1, wherein said second temperature increasing rate is 200° C./hr or more.

8. The method of manufacturing the fired ceramic body according to claim 1, wherein said second temperature increasing rate is 800-2000° C./hr.

* * * * *